US007873873B2

United States Patent
(12) United States Patent
Marr et al.

(10) Patent No.: US 7,873,873 B2
(45) Date of Patent: Jan. 18, 2011

(54) REMOTE ACCESS INTEGRATED TESTER

(75) Inventors: Paul Marr, Roanoke, VA (US); David J. Boyes, Roanoke, VA (US)

(73) Assignee: Acterna LLC, Germantown, MD (US)

( * ) Notice: Subject to any disclaimer, the term of this patent is extended or adjusted under 35 U.S.C. 154(b) by 493 days.

(21) Appl. No.: 12/041,909

(22) Filed: Mar. 4, 2008

(65) Prior Publication Data

US 2008/0219335 A1 Sep. 11, 2008

Related U.S. Application Data

(60) Provisional application No. 60/892,997, filed on Mar. 5, 2007.

(51) Int. Cl.
*G06F 11/00* (2006.01)

(52) U.S. Cl. .......................................... 714/43; 379/21

(58) Field of Classification Search .................. 714/43; 455/226.1; 379/21

See application file for complete search history.

(56) References Cited

U.S. PATENT DOCUMENTS

| | | | | |
|---|---|---|---|---|
| 5,533,093 | A * | 7/1996 | Horton et al. | 379/21 |
| 5,583,912 | A * | 12/1996 | Schillaci et al. | 379/21 |
| 5,703,929 | A * | 12/1997 | Schillaci et al. | 379/21 |
| 5,884,202 | A * | 3/1999 | Arjomand | 701/29 |
| 5,896,569 | A * | 4/1999 | Butler et al. | 455/423 |
| 6,802,032 | B1 * | 10/2004 | Budinger et al. | 714/46 |
| 6,868,117 | B1 | 3/2005 | Mardinian | |
| 7,142,960 | B2 * | 11/2006 | Grier et al. | 701/29 |
| 7,584,313 | B1 * | 9/2009 | Hay et al. | 710/62 |
| 7,761,627 | B2 * | 7/2010 | Christison et al. | 710/62 |
| 2005/0141553 | A1 * | 6/2005 | Kim et al. | 370/466 |
| 2006/0179144 | A1 * | 8/2006 | Nagase | 709/226 |
| 2006/0187905 | A1 * | 8/2006 | Manabe | 370/352 |
| 2008/0005395 | A1 * | 1/2008 | Ong et al. | 710/36 |
| 2008/0133784 | A1 * | 6/2008 | Woodings et al. | 710/19 |
| 2009/0006676 | A1 * | 1/2009 | Sampat et al. | 710/62 |

FOREIGN PATENT DOCUMENTS

| | | |
|---|---|---|
| EP | 0712228 | 5/1996 |
| WO | 2004/032461 | 4/2004 |

OTHER PUBLICATIONS

EPO Search Report EP 08 25 0739 dated Feb. 26, 2009.

* cited by examiner

*Primary Examiner*—Bryce P Bonzo
(74) *Attorney, Agent, or Firm*—Mathew A. Pequignot; Pequignot + Myers LLC

(57) ABSTRACT

In conventional testing, the user is using an on-hand computing device to control testing; however, for the present invention the user is at the access point and the computer is remote, e.g. nearby or in the technician's vehicle, and not being used by the user to run the tests. The present invention provides a means to conveniently connect a customer provided network access device, e.g. a USB "dongle" modem, via a wireless link to the remote computer, which is providing the test application. The computer is remote, and the remote module device extends the reach of the commercial dongle modem so it is not necessary to carry the computer to the test access point.

6 Claims, 3 Drawing Sheets

REMOTE ACCESS INTEGRATED TESTER

CROSS-REFERENCE TO RELATED APPLICATIONS

The present invention claims priority from U.S. Patent Application No. 60/892,997 filed Mar. 5, 2007, entitled "Remote Access Broadband Interface Tool (RABIT)", by Marr et al., which is incorporated herein by reference.

TECHNICAL FIELD

The present invention relates to a network testing device, and in particular to a remote access testing device for cable and telecommunication networks.

BACKGROUND OF THE INVENTION

Currently, cable and telecommunications networks are tested by sending a technician with a laptop and a USB modem to a predetermined test point in the network. The laptop contains software to run the preprogrammed tests of the network. The USB modem provides means for connecting to the network at the test point. The USB modem is connected to the laptop through a cable to a USB port on the laptop. The laptop is already been supplied with the driver software that is needed in order to implement a USB connection between the laptop and the USB modem.

A problem with this method of testing the network is that the locations of the test points in the network are often not easily accessible and there is no access to local power thereby making it difficult for the technician to access the test point with the test equipment. Furthermore, the laptop computer requires expensive upgrading because it needs to be ruggedized for use in the field.

When a technician uses a USB-connected "dongle" modem and a personal computer (PC) as testing equipment, difficulties arise when trying to carry the equipment to remote or hazardous test access points in the network, wherein the PC is exposed to harsh environments.

A number of major telephone companies around the world want to save costs by using "dongle" modems with their PCs to replace test equipment, since the off-the-shelf, mass produced "dongle" USB modems are far less costly than test equipment.

An object of the present invention is to overcome the shortcomings of the prior art by providing remote access testing equipment, which relieves the technician of the need to take their PC to the test point to run their tests, by providing a handheld module connected to a dongle USB modem and in wireless communication with the PC.

SUMMARY OF THE INVENTION

Accordingly, the present invention relates to a system for field testing a communication network comprising:

a computer providing testing procedures to be carried out on the communication network;

a handheld module for use by a technician remote from and in wireless communication with said computer;

a modem extending from the handheld module for connecting with a desired test point in the communication network;

wherein the handheld module receives the testing procedures from the computer and implements them into the communication network via the modem;

wherein the handheld module receive testing data from the modem and transmits them to the computer via wireless communication;

wherein the handheld module receives testing results from the computer via wireless communication for communicating the testing results to the technician; and wherein driver software for the modem resides only in the computer to enable the handheld module to be used for different communication networks.

Another aspect of the present invention relates to a system for testing a network in the field comprising;

a network access modem device including a first connector for accessing the network at a predetermined test access point, and a second USB connector;

a computer with testing procedures thereon for conducting the tests of the network located remotely from the predetermined test point; and a battery-powered wireless USB interface device connected to the network access modem via the second USB connector, and in wireless communication with the computer, the interface device including communication means for visual display and/or audio communication of test results;

wherein the interface device includes control means for initiating the tests on the computer, for receiving the tests from the computer, for transmitting the tests to the network via the network access modem, for receiving test results via the network access modem, for transmitting the test results to the computer, and for receiving and communicating compiled test results from the computer via the communication means.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
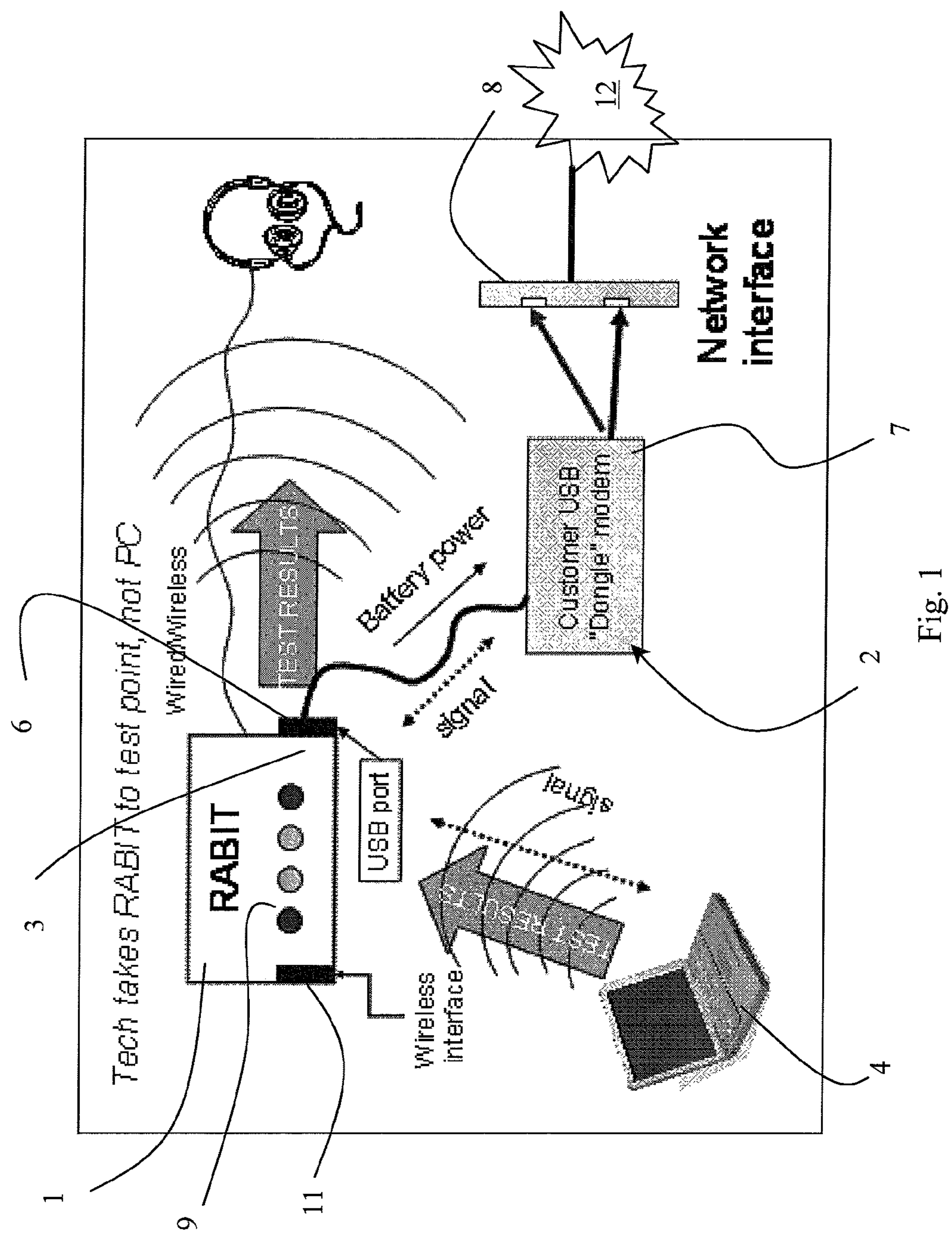
FIG. 1 is a schematic diagram of the system of the present invention.
Figure 2:
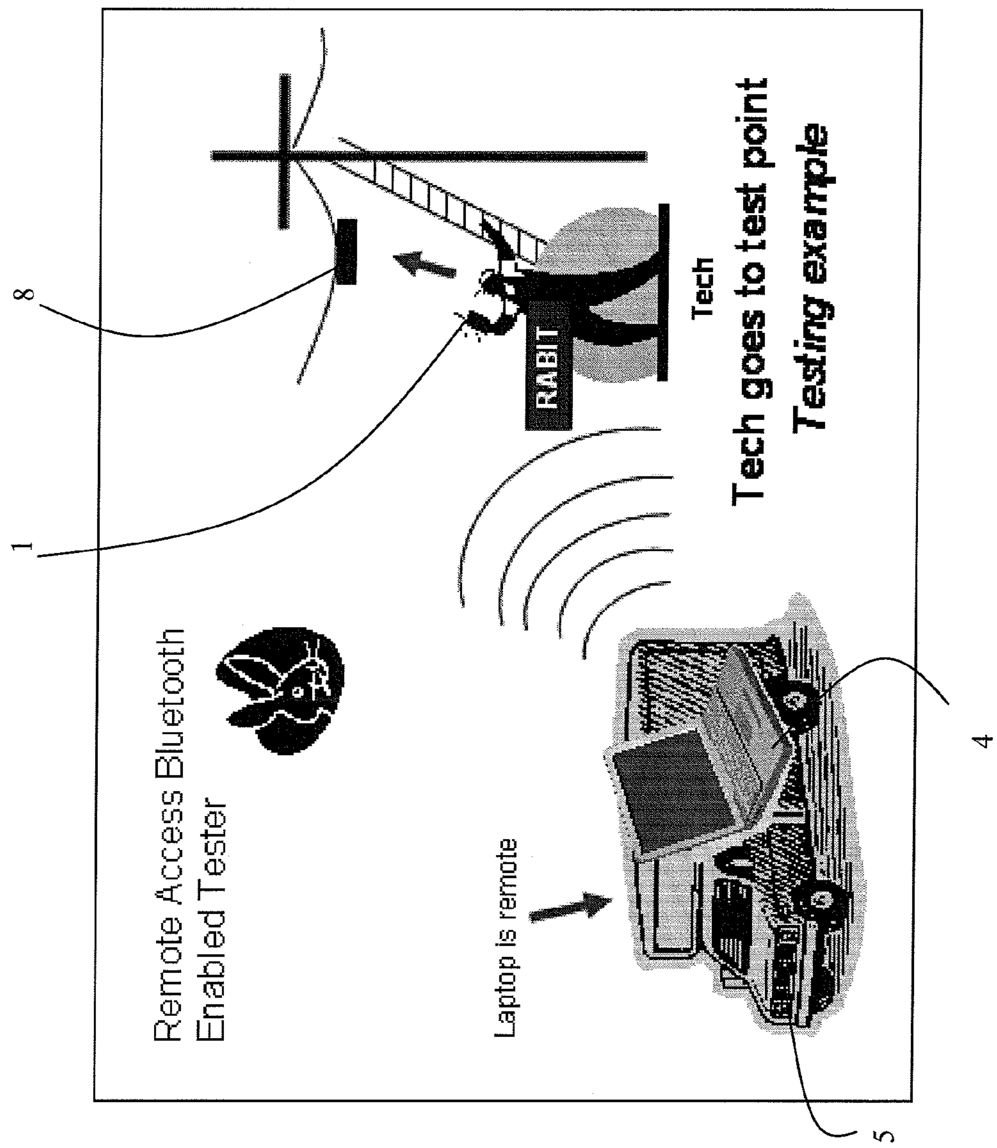
FIG. 2 is a schematic diagram of the system of the present invention.
Figure 3:
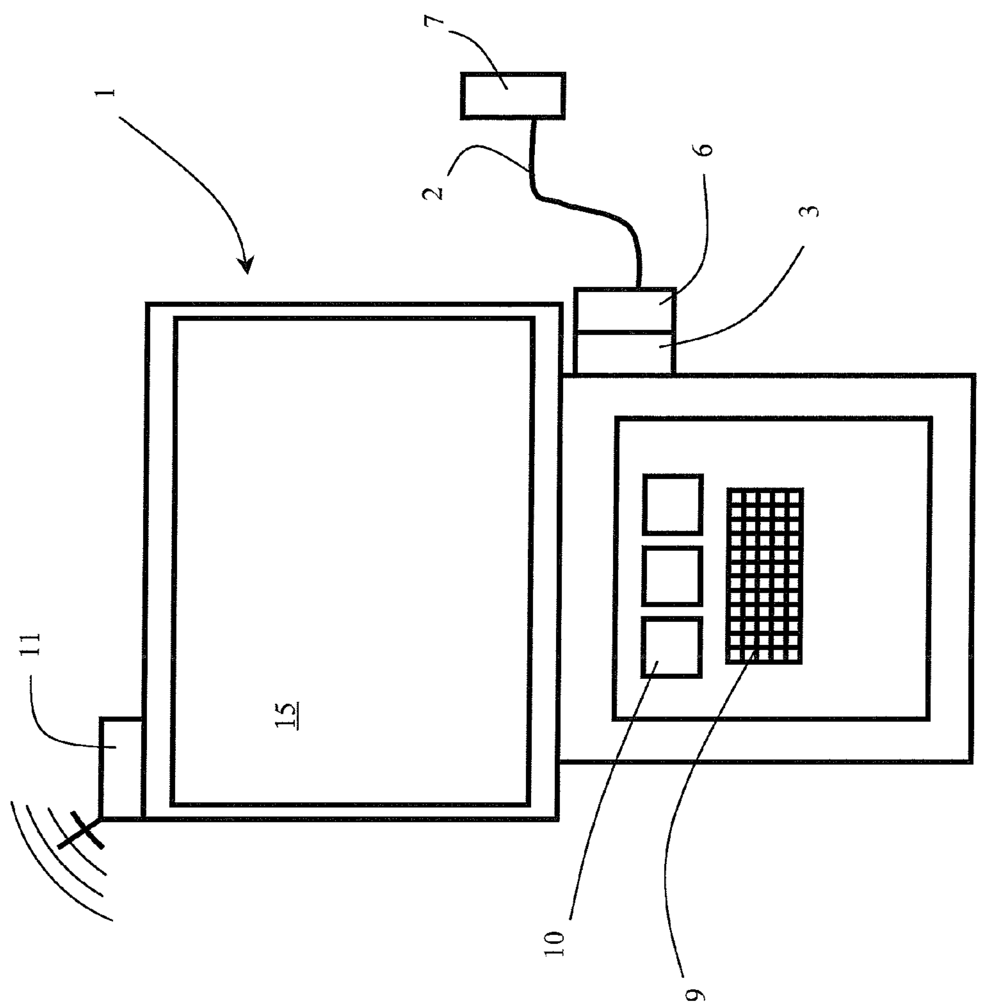
FIG. 3 is schematic diagram of a remote module of the system of FIGS. 1 and 2.

With reference to FIGS. 1 and 2, the present invention comprises a remote module 1, providing a wireless interface between a dongle modem 2 connected thereto via an external port 3, e.g. USB, and a personal computer 4, e.g. a laptop or other form of PC stored in a remote location, such as the technician's vehicle 5. The remote module 1 is not a network test interface or a testing device, but a wireless "bridge" or extension between the dongle modem test interface 2 and the computer 4, which contains the testing protocols.

The dongle modem 2, e.g. disclosed in U.S. Pat. No. 6,868,117, which is incorporated herein by reference, includes a first connector 6, e.g. a USB connector, for connecting to the USB port 3, and a second a connector 7 for connecting to network interfaces 8. Accordingly, the connector 7 can be any one of a variety of conventional interface connectors, e.g. an RJ-11 combo jack for analog and digital signals, for launching test signals onto a network 12 and receiving test results therefrom.

The remote module 1 includes a user interface 9 and a computer micro-controller 10 for enabling a user to contact the computer 4, via wireless interface 11 to initiate the testing procedures stored on the computer 4, which are transferred back to the remote module 1 via the wireless link, through the dongle modem 2 to the network under test 12. Under control of the computer micro-controller 10 and the main computer 4, the testing signals, returning from the network under test 12, pass through the dongle modem 2 to the remote module 1, which transfers the data back to the computer 4 over the wireless link.

The remote module 1 can then receive test results from the computer 4, and provide some test result indications for the user for display on the display screen 15 of the remote module 1. In addition, the remote module 1 can provide visual and audio indications of test status derived from the remote computer 4, as the tests are conducted.

The present invention provides three benefits for customers: 1) reduces maintenance costs on the computers 4 by reducing exposure to harsh environment; 2) enables testing companies to buy off-the-shelf commercial computers 4, instead of ruggedized laptops, thus saving money; and 3) makes the application of tests easier and more effective for the technicians and provider by using laptops instead of hand held modules as testers.

Additional benefit of placing USB drivers on the computer 4 instead of the handheld module 1:

The handheld module 1 accommodates many different off-the-shelf customer USB modems 2; however, the present invention eliminates the need to load the many different device drivers on the handheld module 1, by enabling the drivers to be stored only on the laptop/PC computer 4, by the normal commercial software which accompanies the USB modems Accordingly, technicians can look to the commercial market place to supply low-cost USB "dongle" modems 2 and associated drivers, which are already tested and compatible with their computer 4, i.e. the handheld module 1 does not impose a new driver requirement nor burden the computer 4 with drivers. Therefore, technicians have the freedom to change and upgrade their modems 2 without losing support from the handheld module 1 as the technologies evolve and improve, and customers want to deploy new feature and capabilities.

We claim:

1. A system for field testing a communication network comprising:

a computer providing testing procedures to be carried out on the communication network;

a handheld module for use by a technician remote from and in wireless communication with said computer;

a modem extending from the handheld module for connecting with a desired test point in the communication network;

wherein the handheld module receives the testing procedures from the computer and implements them into the communication network via the modem;

wherein the handheld module receive testing data from the modem and transmits them to the computer via wireless communication;

wherein the handheld module receives testing results from the computer via wireless communication for communicating the testing results to the technician; and wherein driver software for the modem resides only in the computer to enable the handheld module to be used for different communication networks.

2. The system according to claim 1, further comprising:

a visual or audio means for indicating to a technician holding the handheld module the results of the tests of the network conducted by the remotely located computer.

3. A system for testing a network in the field comprising;

a network access modem device including a first connector for accessing the network at a predetermined test access point, and a second USB connector;

a computer with testing procedures thereon for conducting the tests of the network located remotely from the predetermined test point; and a battery-powered wireless USB interface device connected to the network access modem via the second USB connector, and in wireless communication with the computer, the interface device including communication means for visual display and/or audio communication of test results;

wherein the interface device includes control means for initiating the tests on the computer, for receiving the tests from the computer, for transmitting the tests to the network via the network access modem, for receiving test results via the network access modem, for transmitting the test results to the computer, and for receiving and communicating compiled test results from the computer via the communication means.

4. The system according to claim 3, further comprising:

a visual or audio means for indicating to a technician holding the handheld module the results of the tests of the network conducted by the remotely located computer.

5. A handheld module for field testing a network at predetermined test point comprising:

a USB port for connecting by means of a USB cable to a USB modem capable of accessing the network at the test point;

a wireless connection for providing a wireless link to a remotely located computer that is used in conducting the tests of the network; and means for battery powering the handheld module;

wherein the driver software required to facilitate a USB connection through the wireless link and the handheld module to the USB modem resides only within the computer.

6. The module according to claim 5, further comprising: a visual or audio means for indicating to a technician holding the handheld module the results of the tests of the network conducted by the remotely located computer.

* * * * *